United States Patent [19]

Godawski

[11] Patent Number: 4,489,253
[45] Date of Patent: Dec. 18, 1984

[54] AUTOMATIC DEGAUSSING CIRCUIT WITH SWITCH MODE POWER SUPPLY

[75] Inventor: Theodore J. Godawski, Des Plaines, Ill.

[73] Assignee: Zenith Electronics Corporation, Glenview, Ill.

[21] Appl. No.: 438,197

[22] Filed: Nov. 1, 1982

[51] Int. Cl.³ .............................................. H01J 29/06
[52] U.S. Cl. .............................................. 315/8; 315/1
[58] Field of Search .......................................... 315/8, 1

[56] References Cited

U.S. PATENT DOCUMENTS

| | | | |
|---|---|---|---|
| 2,962,621 | 11/1960 | Fernald | 315/8 |
| 3,324,344 | 6/1967 | Norley | 315/8 |
| 3,344,307 | 9/1967 | Van Anrcoy et al. | 315/8 |

Primary Examiner—Harold Dixon

[57] ABSTRACT

A degaussing circuit for a color television receiver has a continuously energized switch mode power supply feeding a voltage doubler coupled to a resonating capacitor connected in series with a degaussing coil for charging the capacitor while the receiver is off. A triac connects the capacitor and the degaussing coil in parallel when the television receiver low voltage on/off switch is turned on.

9 Claims, 1 Drawing Figure

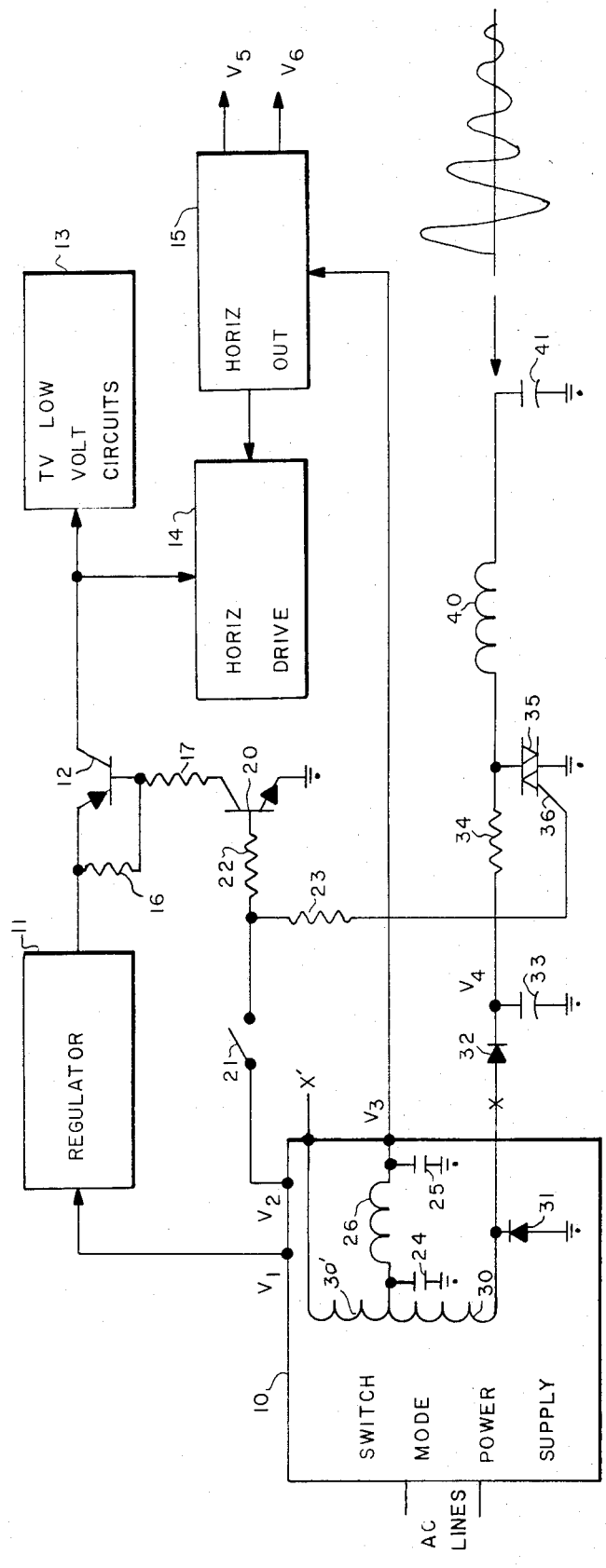

AUTOMATIC DEGAUSSING CIRCUIT WITH SWITCH MODE POWER SUPPLY

BACKGROUND OF THE INVENTION

This invention relates in general to color television picture tube degaussing circuits and particularly to picture tube degaussing circuits in color television receivers incorporating switch mode type power supplies.

The need for periodic degaussing or demagnetization of color television picture tubes is well known. Arrangements commonly in use include one or more coils of wire situated closely adjacent to the picture tube and circuit means for producing a high initial amplitude, rapidly decaying, alternating current in the coils to produce a tapered alternating magnetic field for demagnetization. One prior art circuit develops a degaussing field from the large inrush charging current to the electrolytic capacitors in the receiver power supply. A relay is provided for disconnecting the degaussing coils after the inrush current subsides. Another circuit uses a series-connected positive temperature coefficient resistor for tapering the current to the degaussing coils. Still another circuit has a resonating capacitor connected in a tuned circuit arrangement with the degaussing coils, the "ringing" discharge current through the degaussing coils producing a tapered alternating magnetic field for degaussing.

Modern television receivers are increasingly using so-called switch mode power supplies which, though continuously energized, experience very low standby power loss when the load is disconnected. They are therefore very efficient and cost effective. Most of the higher operating voltages required by the receiver are derived from the horizontal output circuit and the switch mode supply has only relatively low voltages available in standby. The low voltage supply to the receiver and the horizontal drive circuit is conventionally switched. Without the horizontal drive circuit being energized, the horizontal output circuit is disabled which, in turn, disables the receiver. Therefore, a simple low voltage switch may be used to control the on-off function of the receiver. Most prior art color television receivers having switch mode power supplies include conventional degaussing circuits as distinct from degaussing circuits using resonating capacitors.

One prior art color receiver with a switch mode power supply does incorporate a resonating capacitor type degaussing circuit. An SCR switch is used to connect the capacitor across the degaussing coils to produce the required tapered current. A reverse polarized diode is connected in parallel with the SCR for conducting current in the opposite direction, as required for degaussing. The SCR switch has a gate electrode which is triggered on and maintained conductive by a transistor switch that is energized from a voltage produced when the receiver's horizontal output circuit is energized (the horizontal output circuit is disabled when the receiver is off). The horizontal output circuit voltage rapidly charges the resonating capacitor immediately upon "turn on" of the receiver through a fairly short time constant charge circuit. Another, longer time constant circuit drives a neon bulb switch which energizes the transistor switch to acitvate the SCR gate. The transistor switch also supplies enabling voltage to the picture tube through a delay circuit which maintains the picture tube non conductive for a short period of time after turn on of the receiver--during which time degaussing occurs. The transistor switch is held conductive while the receiver is on to keep the SCR energized and prevent the resonating capacitor from recharging (and magnetizing the picture tube). Suffice it to say that the circuit is extremely complex and costly.

SUMMARY OF THE INVENTION

In accordance with the invention, a color television receiver includes a continuously energized switch mode power supply, switch means coupled to the power supply for turning the receiver on and off, degaussing means including a picture tube degaussing coil and a resonating capacitor connected to the power supply, the resonating capacitor being charged from the power supply when the receiver is off, and an electronic switch electrically connecting the degaussing coil in parallel with the resonating capacitor for producing a degaussing current in the coil whenever the receiver is turned on.

OBJECTS OF THE INVENTION

The principal object of this invention is to provide an improved color television receiver.

Another object of this invention is to provide a color television receiver having a low cost degaussing arrangement.

Other objects of the invention will become apparent upon reading the following description of the preferred embodiment thereof in conjunction with the drawing in which the single figure depicts a schematic diagram of a television receiver constructed in accordance with the invention.

DESCRIPTION OF THE PREFERRED EMBODIMENT

Referring to the drawing, an AC line of conventional 120 volt 60 Hz power is connected to a switch mode power supply 10 having a plurality of voltage terminals V1, V2, and V3 associated therewith. V1 may represent a nominal 12 volt d.c. output supplied to a voltage regulator 11 for delivering 12 volt d.c. regulated voltage to the low voltage television receiver circuits. This is accomplished through a high current switch comprising a transistor 12 having its emitter-collector path connected in circuit with regulator 11 and TV low voltage circuits 13. The collector electrode of transistor 12 is also connected to a horizontal drive circuit 14 which in turn supplies a horizontal output circuit 15 having further output terminals V5 and V6 representing higher level d.c. voltages. A bias resistor 16 is connected from the emitter electrode to the base electrode of transistor switch 12. The base of transistor 12 is further connected, through a resistor 17, to the collector electrode of a low current transistor switch 20 having a grounded emitter electrode and a base electrode connected, through a resistor 22, to a low voltage switch 21. The other terminal of switch 21 is connected to power supply terminal V2, which may present approximately 18 volts d.c.. It will be appreciated by those skilled in the art that switch 21 is illustrated symbolically and in practice may comprise an electronic switch, operated either remotely or manually. Switch 21 also couples V2 to the gate electrode 36 of a triac 35 through a resistor 23.

Power supply 10 includes a secondary transformer winding 30, coupled to ground through a diode 31 and, through a filter network, comprising a pi arrangement of capacitors 24 and 25 and an inductor 26, to terminal V3 which supplies approximately 130 volts d.c. to horizontal output circuit 15. The 130 volts represent a maximum because of the danger of exceeding the breakdown voltage of the horizontal output semiconductor device. The d.c. circuit is completed via a ground connection (not shown) in horizontal output 15. The addition of diode 32 and capacitor 33 to the junction of winding 30 and diode 31 provides a voltage doubling action for developing a still higher potential, on the order of 300 volts d.c., at junction V4. Junction V4 is connected through a large value resistor 34 to one terminal of triac 35, the other terminal of which is connected to ground. Triac 35 includes gate electrode 36 which, as mentioned above is coupled back to low voltage switch 21. The upper terminal of the triac is connected to one end of a degaussing coil 40, the other end of which is connected to a ground-connected resonating capacitor 41. The waveform indicated at the junction of degaussing coil 40 and capacitor 41 illustrates the degaussing current through the coil and is seen to decay for producing an appropriately tapered magnetic field. The picture tube and other circuits of the color television receiver are well known in the art and are omitted for clarity.

In the receiver's "off" condition, low voltage switch 21 is opened. Thus transistor 20 is nonconductive and gate 36 of triac 35 is not energized. With transistor 20 nonconductive, transistor 12 does not conduct and the voltage from regulator 11 is not presented to the low voltage TV circuits 13 or to horizontal drive circuit 14. The voltages developed on switch mode power supply terminals V1, V2 and V3 however, are present even when the receiver is off. Therefore the "doubled" potential at junction V4 exists and capacitor 41 is charged since it is connected in series with diodes 31 and 32, resistor 34 and degaussing coil 40. Triac 35 is nonconductive because its gate electrode 36 has no applied voltage.

An alternate approach to achieving higher voltage for charging capacitor 41 is also illustrated. An "overwinding" 30' is shown connected to the high side of secondary winding 30. The winding end is indicated by X'. In this arrangement, the connection of the anode of diode 32 is changed from X to X'. The additional winding 30' develops the required voltage for operation of the degaussing circuit which is rectified by diode 32 and added to the d.c. present at V3. Obviously, other voltage increasing arrangements may be used with equal facility, the criteron being to develop a sufficiently high d.c. for charging the resonating capacitor.

Upon closure of switch 21, transistor 20 conducts, forcing transistor 12 conductive and enabling the TV low voltage circuits, the horizontal drive circuit and gate 36, which forces triac 35 to conduct. Triac 35 in conducting presents a short circuit from the high side of degaussing coil 40 to ground and thus places degaussing coil 40 directly across resonating capacitor 41. The charge stored in resonating capacitor 41 establishes a ringing current between the capacitor and the degaussing coil, substantially as shown by the indicated waveform, for degaussing the picture tube. The triac is held conductive by the potential applied to its gate 36 for both directions of current flow during ringing.

It will also be noted that while triac 36 is maintained conductive when the receiver is on, its current flow is limited by the presence of large resistor 34. Since degaussing current flows for less than 16 ms, triac 35 only conducts large currents for a very short period of time. Thus, a small inexpensive triac may be used in the circuit. Similarly the added capacitor 33 need not be an expensive electrolytic type, but may be quite small-on the order of 0.002 microfarad-with a voltage rating of approximately 300 volts. Because the resonating capacitor has a very long time to charge while the receiver is off, capacitor 33 doesn't need a lot of capacity. The resonating capacitor only conducts heavy current during the short degaussing cycle and therefore experiences a very small average current. Consequently, it need only have an average current handling capability which in terms of cost, means that a polyester type capacitor rather than a polypropylene type capacitor may be used.

Thus, the invention enables use of a conventional switch mode power supply by the simple addition of a diode and small capacitor to form a voltage doubler to achieve the higher voltage needed for an effective low cost resonating capacitor-degaussing coil combination in which the capacitor is charged when the receiver is off. An overwinding on the switch mode power supply transformer secondary winding may also be added where even larger voltages are desired. The resultant circuit is extremely simple, straightforward, and cost-effective.

What has been described is a novel color television receiver and degaussing circuit especially adapted for use with a switch mode power supply. It will be recognized that numerous modifications in the described embodiment of the invention will occur to those skilled in the art without departure from the invention as defined in the claims.

What is claimed is:

1. A color television receiver comprising:
   a continuously energized switch mode power supply having a high voltage terminal and a low voltage terminal;
   low voltage switch coupled to the low voltage terminal of said power supply for turning said receiver on and off; voltage multiplier means connected to the high voltage terminal;
   degaussing means, including a picture tube degaussing coil and a resonating capacitor, connected to said power supply, said resonating capacitor being connected to said multiplier output and charged from said power supply to a voltage higher than that at said high voltage terminal when said receiver is off; and
   electronic switch means including an energizing terminal coupled to said low voltage switch, said switch electrically connecting said resonating capacitor in parallel with said degaussing coil for producing a degaussing current therein whenever said receiver is turned on.

2. A television receiver as set forth in claim 1 wherein said electronic switch means comprises a bidirectional switching triac.

3. A television receiver as set forth in claim 3 wherein said receiver includes a horizontal output circuit coupled to said high voltage terminal, a horizontal drive circuit coupled to said low voltage switch and voltage increasing means AC coupled between said high voltage terminal and said degaussing means for producing said higher voltage for said degaussing means.

4. A television receiver as set forth in claim 3, further including;
   a large resistance connected between said power supply and said triac for minimizing current flow in said triac when said receiver is on.

5. A television receiver as set forth in claim 4 wherein said switch mode power supply includes a transformer winding coupled to said high voltage terminal and wherein said voltage increasing means comprise:
   an overwinding on said transformer winding, said connecting means being coupled to said overwinding rather than to said high voltage terminal.

6. A television receiver as set forth in claim 4 wherein said voltage increasing means comprise a voltage doubler arrangement.

7. A color television receiver comprising:
   a continuously energized switch mode power supply having a high voltage terminal and a low voltage terminal;
   a low voltage switch coupled to said low voltage terminal for turning said receiver on and off;
   degaussing means, including a picture tube degaussing coil and a resonating capacitor, coupled to said high voltage terminal, said resonating capacitor being normally connected to the high voltage terminal and thereby charged from said power supply when said receiver is off;
   a triac switch electrically connecting said resonating capacitor in parallel with said degaussing coil for producing a degaussing current therein whenever said receiver is turned on, said triac switch including a gate electrode energized from closure of said low voltage switch; and
   voltage multiplier means coupled to said switch mode power supply for producing a still higher voltage for application to said degaussing means.

8. A television receiver as set forth in claim 7 wherein said voltage increasing means includes a voltage doubler coupled to said high voltage terminal.

9. A television receiver as set forth in claim 7 wherein said switch mode power supply includes a transformer winding coupled to said high voltage terminal and wherein said voltage increasing means comprise an overwinding on said transformer winding for providing a higher voltage.

* * * * *